Sept. 13, 1949.   G. H. HOLLINGSWORTH ET AL   2,481,510
TRANSITION TRAINER Filed Dec. 28, 1945   6 Sheets-Sheet 1

INVENTORS
GEORGE H. HOLLINGSWORTH
ROCCO A. TRAFICANTE
ERNEST V. BURTON
BY
Raymond J. Crowley
ATTORNEYS

Sept. 13, 1949. G. H. HOLLINGSWORTH ET AL 2,481,510
TRANSITION TRAINER
Filed Dec. 28, 1945 6 Sheets-Sheet 2

Sept. 13, 1949. G. H. HOLLINGSWORTH ET AL 2,481,510
TRANSITION TRAINER
Filed Dec. 28, 1945 6 Sheets-Sheet 3

INVENTORS
GEORGE H. HOLLINGSWORTH
ROCCO A. TRAFICANTE
ERNEST V. BURTON
BY
Clade Koontz
Raymond J. Brokley
ATTORNEYS Sept. 13, 1949.        G. H. HOLLINGSWORTH ET AL        2,481,510
TRANSITION TRAINER

Filed Dec. 28, 1945                         6 Sheets-Sheet 4

INVENTORS
GEORGE H. HOLLINGSWORTH
ROCCO A. TRAFICANTE
ERNEST V. BURTON
ATTORNEYS

Patented Sept. 13, 1949

2,481,510

UNITED STATES PATENT OFFICE 2,481,510

TRANSITION TRAINER

George H. Hollingsworth, Long Beach, Calif., Ernest V. Burton, Seymour Johnson Field, N. C., and Rocco A. Traficante, Meriden, Conn.

Application December 28, 1945, Serial No. 637,760

7 Claims. (Cl. 35—12)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a device for the transition training of pilots to enable pilots who have completed training on primary training aircraft to become thoroughly familiar with cockpit and flight procedure and the handling of pursuit and multiengine aircraft prior to attempting any flights in the latter.

During the recent war a large number of accidents have occurred in the transition training of students, particularly where students are required to fly high performance single-engine pursuit airplanes. This difficulty has been largely traced to the fact that heretofore the student was instructed in the position of the various power plant and other instruments and controls in the airplane cockpit and became familiar with the cockpit layout only by being seated in the airplane and by study of instruction manuals and briefing. This course of transition training did not provide for the actual operation of the power plant controls for the sequence of operation during take-off, flight and landing, nor did it provide for instructing the student such that he would instinctively take the proper measures for safety in an emergency. As a result of the above type of training numerous accidents have occurred during the early flight period on pursuit aircraft because the student became confused when faced with a multiplicity of instruments and controls and failed to carry out the proper operation procedure, examples being failure to lower the flaps in landing, failure to retract the undercarriage after take-off and failure to operate the fuel system such as to cut in a full tank upon exhaustion of a main or auxiliary tank.

In accordance with the present invention a trainer is provided comprising a full-sized aircraft mounted above the ground in a cradle support such that the engine and propeller may be operated exactly as during the take-off, flight and landing phases of an actual flight and the undercarriage and wing flaps may be extended and retracted to simulate the actuation of the same during periods of take-off and landing. The aircraft engine, in addition to driving the propeller, is used in the conventional manner as a source of power for actuation of the hydraulic system for landing gear and flap actuation and the aircraft in all respects is similar to a service machine. An instructor's booth is located away from, and slightly to the rear of, the aircraft wing so that the instructor always has the aircraft and cockpit in full view and the aircraft is provided with the usual instrument panel containing the various engine and flight factor indicators and controls. In the instructor's booth there is provided a master control panel and an instrument panel duplicating the one in the aircraft. All of the various pressure transmitting sources for deriving a pressure or an electrical quantity indication varying as a function of some flight operation factor; for example, oil pressure, hydraulic system pressure, oil temperature, quantity of fuel and the like, are directly transmitted from the various transmitter units of conventional character in the airplane directly to master instruments on the control panel. The master instruments on the control panel indicate at all times the actual values of, for example, oil pressure, fuel pressure, hydraulic system pressure and engine manifold pressure and also quantities such as gallons of fuel remaining in the respective aircraft fuel tanks, generator amperes, engine revolutions and the like, the control panel also having indicators indicating the fuel tanks selected for fuel supply and the propeller pitch setting. The duplicate aircraft instrument panels have the instruments thereon corresponding to the instruments on the master control panel connected in parallel to the master control panel with control means provided so that certain indications such as hydraulic system pressure, oil pressure, fuel pressure, manifold pressure and the like transmitted to the duplicate instrument board in the airplane cockpit and instructor's booth may be altered from the actual system condition to thereby simulate emergency operating conditions which require the immediate attention of the student pilot occupant of the trainer.

The trainer cockpit and instructor's booth are provided with an inter-communication system whereby the student and instructor may converse in a manner similar to radio conversation with a control tower.

During operation the student is first briefed on a simulated flight of a predetermined duration and after receiving his instructions he climbs into the airplane and is secured in the seat exactly as if he were preparing for take-off. The engine is then started by the student and warmed up in the usual manner, engine cylinder head temperature and the like being indicated both to the student and the instructor in the booth. After a warm-up period the student informs the instructor that he is ready for take-off, at which time the instructor carefully observes whether the power plant operating conditions are suitable for take-off. The student then opens the throttle and controls the propeller pitch during a simulated take-off and again adjusts the throttle and propeller pitch for climb and ultimately simulates leveling off at an altitude as indicated on his altimeter which, together with the air-speed indicator, are under the control of the instructor. At any time during the take-off, climb and levelling period the instructor can observe the operation of the trainer with respect to essential power plant and flight factors to determine whether or not the student is following exactly his briefing instructions. The instructor may at will introduce instrument indications simulating faulty operation or emergency conditions and observe the student's reaction.

After a simulated cruising operation for a period of, for example, fifteen minutes the student may prepare for landing and so advise the instructor, who then by watching the instruments determine whether cockpit procedure and flap operation and lowering of the undercarriage with respect to indicated air-speed and altitudes is carried out correctly during the simulated glide, approach and landing.

It is the principal object of the invention to provide grounded training apparatus in which an actual aircraft power plant, variable pitch propeller, retractible landing gear and wing flaps may be operated exactly as in a simulated take-off, flight and landing and in which an instructor at all times is aware of the actual operating conditions and may at will simulate a failure or malfunction of the components to check the student's reaction.

It is a further object of the invention to provide a grounded transition training device for instruction in the proper operation of the power plant, propulsion system, alighting gear and flaps of an airplane and in which a full size operative aircraft is cradled to enable power operation of its components in a manner simulating the actual operation during take-off, flight and landing, the grounded aircraft being positioned in full view of an instructor positioned externally of the aircraft, instrument and indication means being provided at the instructor's position for directly indicating the instant value of power plant and flight operation factors and including means whereby the instructor may give instrument indications in the cockpit of the airplane, simulating indications of malfunction of operative components or dangerous simulated flight factors.

The above and other objects and features of invention will become apparent by reference to the detailed description hereinafter given and to the appended drawings, in which.

Figure 1:
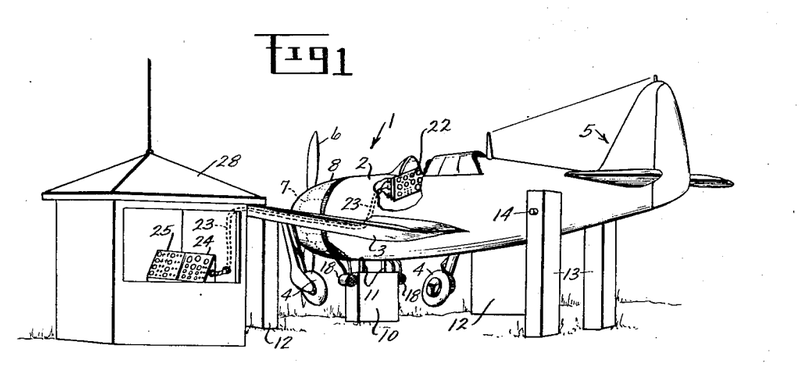
Fig. 1 is an isometric view illustrating the general arrangement of the component parts of a trainer in accordance with the invention.

Referring now to Fig. 1, the trainer in accordance with the present invention is seen to comprise an airplane generally indicated by the reference numeral 1, the type shown being a P-47N or Thunderbolt fighter aircraft having a fuselage 2, wings 3, retractible undercarriage 4, tail assembly 5, propeller 6 and engine 7, housed within the cowling 8, all exactly the same as in aircraft used for flight operation. The aircraft fuselage 2 is supported adjacent its forward end by means of a main concrete pier 10 sunk in the ground and which is provided with adjustable jack screws 11 which are secured at their upper ends to the fuselage structure by riveted attachment means, not shown. Concrete piers 12 spaced outboard from the plane of symmetry of the aircraft have their upper ends contoured such as to form a cradle supporting the wings 3, and concrete piers 13 are placed adjacent the rear of the fuselage to support the latter by means of a rod 14 passing through the fuselage and suitably secured thereto by means of rivets or bolts, not shown. The aircraft 1 is thus cradled by the supporting structure at a height above the ground sufficient to provide ample propeller clearance as well as clearance for operation of the retractible undercarriage 4.

Figure 3:
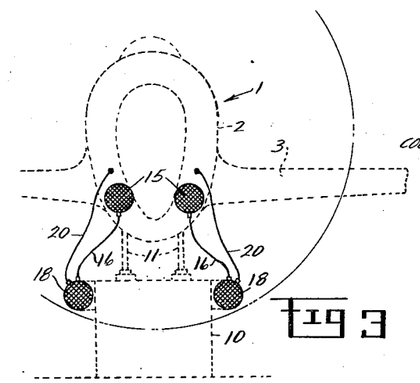
Fig. 3 and 3a diagrammatically illustrate the oil cooling arrangement found necessary to give adequate cooling.
Figure 3A:
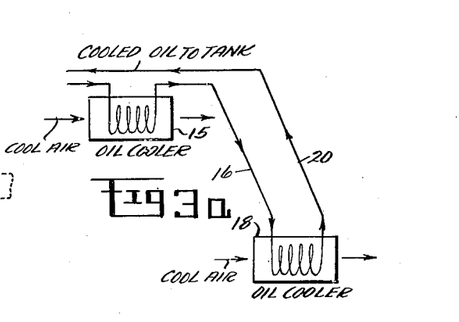
Figure 4:
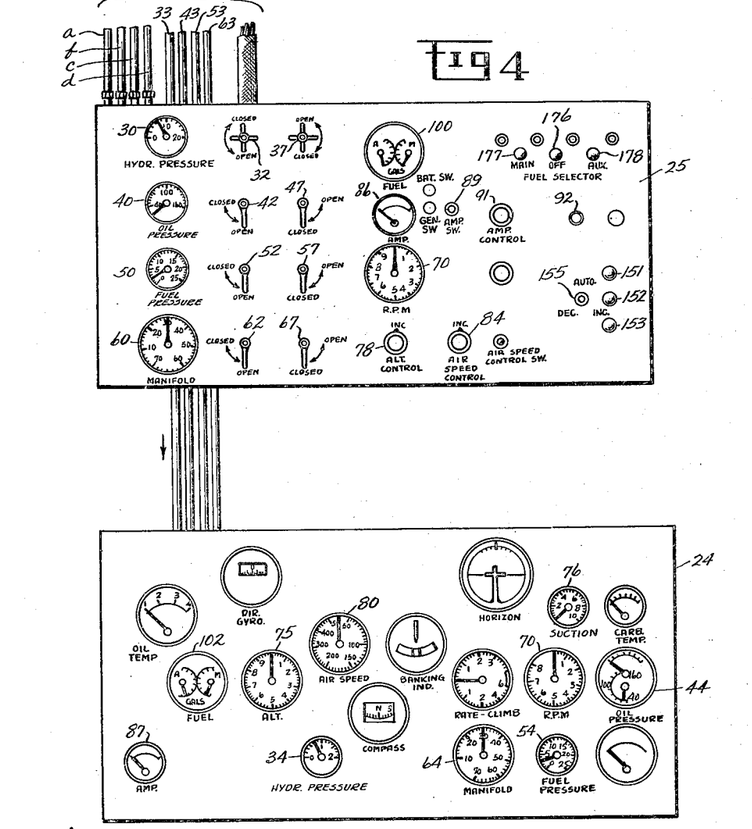
Fig. 4 illustrates the instrument board and master control panel in the instructor's booth.

By reference to Figs. 3 and 4 the oil cooling system is seen to include the usual pair of oil coolers 15 positioned within the engine cowling, each having serially connected thereto by means of conduits 16 supplemental oil coolers 18 rigidly mounted on the central pier 10 so as to be exposed to the propeller blast to supply the necessary supplemental cooling. Return conduits 20 lead the cold oil from coolers 18 to the engine in the usual manner. Fig. 3a illustrates the series cooler hookup and need not be further described.

Figure 2:
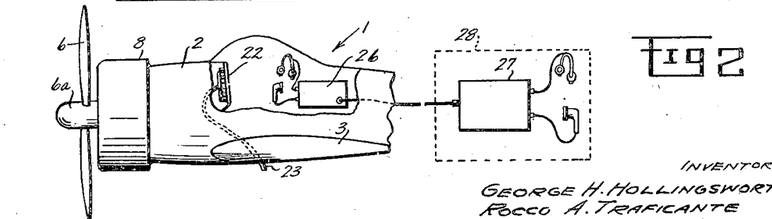
Fig. 2 is a side elevation of the aircraft in Fig. 1.

Referring again to Fig. 1 and as also seen in Fig. 2, the aircraft 1 is seen to have the usual instrument board 22 mounted in the cockpit thereof and which has the various power plant and flight factor instruments mounted thereon, which in the conventional aircraft are actuated from master sources of pressure or electric current derived either directly from the source of pressure or current or transmitted to the instrument board from transmitter units all of which are old and well known in the art. In accordance with the present invention, however, all of the principal functions to be indicated are transmitted by means of conduits and electrical conductors generally indicated by reference numeral 23 to a master instrument or control panel 25 from which in turn an instructor's and observing trainee's instrument panel 24 and the instrument panel 22 in the aircraft cockpit are respectively actuated.

The control panel 25 and instrument panel 24 are positioned in air instructor's booth 28 positioned outboard and slightly to the rear of the left wing panel of the airplane so that the undercarriage, wing flaps, tail assembly and cockpit closure are all visible to the instructor through suitable windows provided in the control booth.

As seen in Fig. 2, reference numerals 26 and 27, respectively, generally indicate the control booth and cockpit units of a conventional telephone inter-communication system which is employed to simulate radio communication between the aircraft and the control tower. In the present case the instructor serves as the control officer.

The control panel and instrument panel arrangement in the instructor's booth is illustrated in Fig. 4. As seen in this figure fluid pressure conduits and electrical conductors lead from the transmitting points in the airplane to the master control panel 25 and other fluid pressure conduits and electrical conductors lead to the airplane instrument panel 22 (Figs. 1 and 2) in the airplane and to the duplicate instrument panel 24 in the instructor's booth. The conduits and conductors are generally indicated by reference character 23. The conduits 23a to 23d, respectively transmit fluid pressures to master gauge units 30, 40, 50 and 60, the indicated pressures being respectively a measure of hydraulic system pressure, engine lubricating oil pressure, fuel pressure and engine intake manifold pressure. Conduits 33, 43, 53 and 63 conduct the indicated pressures to corresponding gauge units 34, 44, 54 and 64 on the instrument panel 24 and to duplicate instruments on the cockpit instrument panel.

The control panel 25 contains manually actuated valve units 32, 37, 42, 47, 52, 57; and 62, 67 for isolating the transmitted hydraulic oil, fuel and manifold pressures from the corresponding gauge units on the instrument panels 24 and 22 and to alter the indication of these factors on the instruments of the panels 24 and 22.

Revolution counters or tachometers 70 are provided on the master control panel 25 and on the duplicate instrument panels 24 and 22. The master control panel 25 also contains a master ammeter 86, master fuel quantity indicator 100, simulated altimeter and air-speed controls 78 and 84, instrument ammeter control 41; fuel cock selector signal means 176—178 and propeller pitch control and indicating means 151—155 and miscellaneous electric power system switches.

The instrument board in addition to the previously noted instruments includes an altimeter 75, air-speed indicator 80; ammeter 87; suction indicator 76 and fuel quantity gage 102 which are operatively connected to instrument indication control means on master control panel 25 and to corresponding duplicate instruments on the airplane instrument board 22. In addition the instrument boards 22 and 24 contain a complete set of flight factor instruments which are employed for visual physiological effects and are not operative. The principal value of the instrument panel 24 in the instructor's booth is to permit other trainees to check on the correctness of operating technique of the trainee pilot operating the trainer. The manner in which the various instrument indications are modified as desired by the instructor and transmitted to the student will now be described.

In accordance with the present invention one of the important features is the fact that the actual pressure or electrical quantity which may be a measure of either a power plant or flight factor function such as oil pressure, hydraulic system pressure, or the like is transmitted in its actual value to the control panel and from the control panel may at the instructor's selection be transmitted unchanged to the duplicate instrument boards positioned respectively in the control booth and in the airplane cockpit, but means are provided interposed between the master indicating units and the duplicate indicators whereby the instructor at will may alter or falsify the indication of the latter without affecting the true value of the function such as engine oil pressure. This provision permits simulated engine oil pressure, hydraulic system pressure, fuel pressure, or engine manifold pressure failure to be simulated without actually disturbing the system on the airplane such as to cause actual failure or dangerous operation of the power plant or other instrumentalities.

Figure 5:
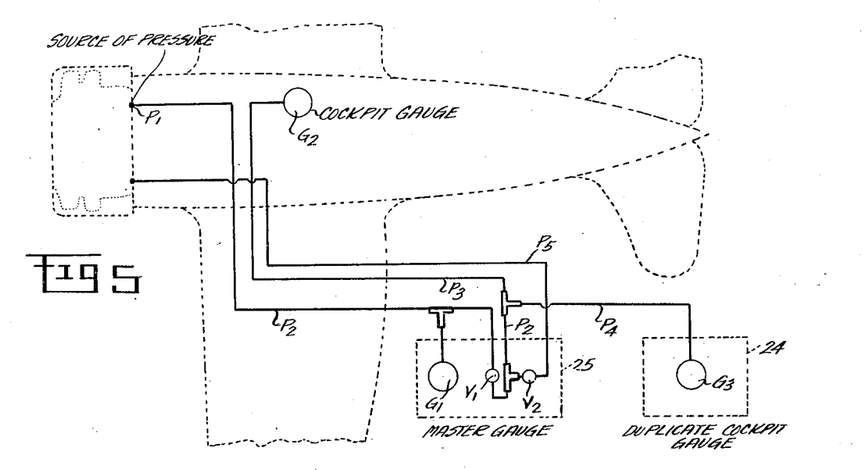
Fig. 5 is a schematic diagram illustrating in general the hookup of the various pressure actuated instruments and means for controlling the cockpit indications of certain of the instruments.

The general scheme of this feature of the invention is illustrated schematically in Fig. 5 in which point $P_1$ is a source of pressure to be indicated, for example, engine oil pressure, hydraulic system pressure and the like, which is conducted by means of a conduit $P_2$ to a master gauge $G_1$ positioned on the master control panel 25. A first control or isolating valve $V_1$ is provided in the conduit $P_2$ and this conduit is branched into conduits $P_3$ and $P_4$ which lead respectively to the cockpit gauge unit $G_2$ mounted on the instrument panel 22 of the airplane 1 of Fig. 1 and a corresponding duplicate gauge unit $G_3$ mounted on the duplicate instrument panel 24 in the instructor's booth. The conduit $P_2$ is further tapped between the valve $V_1$ and the conduits $P_3$ and $P_4$ for a return conduit $P_5$ which may, for example, return fluid to a reservoir, such as an oil tank, or the like, or may be vented directly to the atmosphere, the conduit $P_5$ having the control or bleeder valve $V_2$ mounted therein and adjustable by the instructor. In the operation of this system when valve $V_1$ is open and bleed valve $V_2$ is closed the true pressure transmitted from the source through conduit P is indicated on gauges $G_1$, $G_2$ and $G_3$. When the instructor desires to give a false indication, indicative of for example a falling or reduced oil pressure, he first closes valve $V_1$ while the system is in normal operation so that whatever value of pressure then exists in conduit $P_2$ will be trapped in conduits $P_4$ and $P_3$. This action isolates gauges $G_2$ and $G_3$ from the master gauge $G_1$ and by then slightly opening the bleed valve $V_2$, the trapped fluid under pressure in conduits $P_4$ and $P_3$ is bled to the return conduit $P_5$ causing a slow drop in the pressure indications of gauges $G_2$ and $G_3$. Bleed valve $V_2$ is closed whenever the desired low pressure indication is given on gauges $G_2$ and $G_3$. At any time valve $V_2$ is closed valve $V_1$ may be opened to cause gauges G₂ and G₃ to read the true pressure as indicated at all times on gauge G₁. By momentary sequential operation of the valves V₁ and V₂ the pressure indication in the airplane cockpit may be caused to fluctuate or the indication of a falling or reduced pressure may be given in the manner described above without affecting the true pressure in conduit P₂ or its true indication on gauge G₁. In general, the system is employed throughout the various pressure function indicators which will now be described separately.

Hydraulic System Pressure Indication

Figures 6, 17:
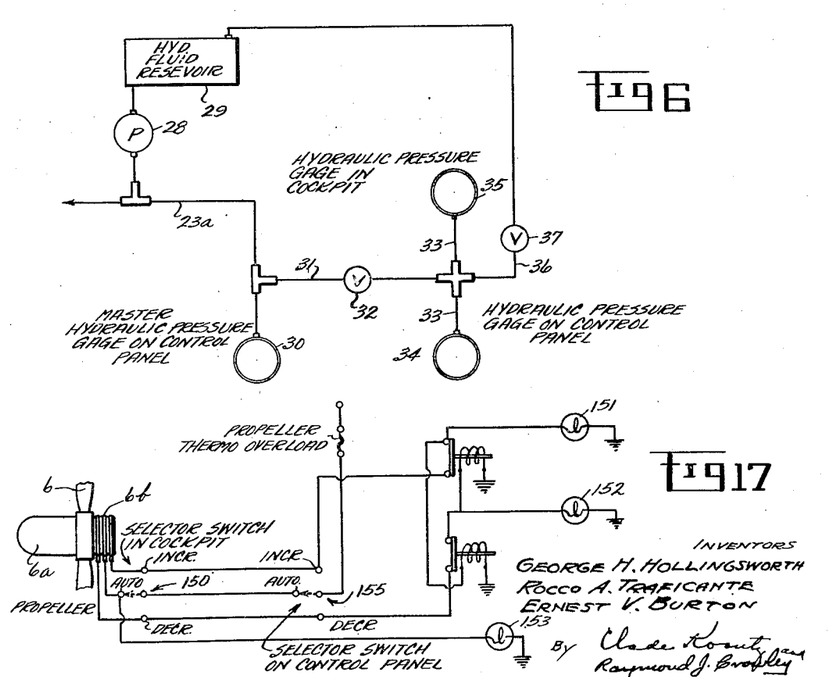
Fig. 6 is a figure schematically illustrating the hookup of the means for indicating hydraulic system pressure.
Fig. 17 is a circuit diagram of the electric variable pitch propeller illustrating the means for intervention by the instructor.

As seen in Fig. 6, the system for indicating hydraulic fluid pressure is similar to that of Fig. 5 and in which the pump 28, conventionally driven by the engine, receives fluid from reservoir 29 and delivers same under high pressure at the pump outlet which is connected by means of a conduit 23a to a master hydraulic pressure gauge 30 mounted on the master control panel 25, Fig. 1. The gauge line 23a is connected by means of a conduit 31 and isolating valve 32 to parallel conduits 33 which are respectively connected to duplicate hydraulic pressure gauges 34 and 35 positioned respectively upon the instrument panel 24 in the control booth and on the instrument panel 22 mounted on the aircraft. A return line 36 and control valve 37 positioned therein serve under manual manipulation to control the bleed-off of trapped pressure back to the reservoir; and, hence, at the instructor's wish control the actual indication on the gauge units 34 and 35 after the gauge units have been isolated from the general system by actuation of valve 32 in the same manner as in the operation of the general pressure indicating system described in conjunction with Fig. 5.

Oil Pressure Indication

Figure 7:
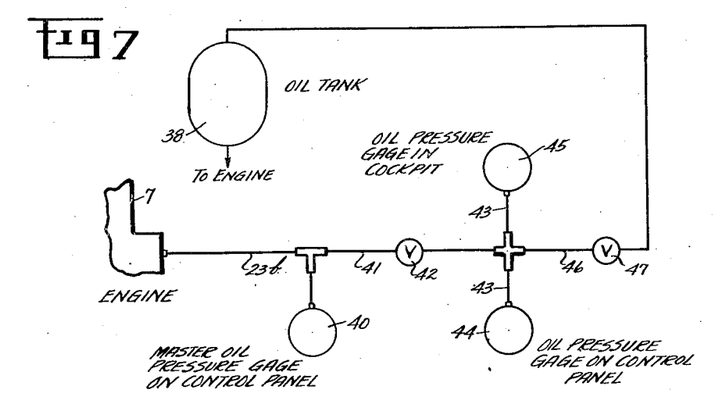
Fig. 7 illustrates the hookup of the engine lubricating oil pressure indicating system.

The oil pressure indication system illustrated in Fig. 7 is similar in general to that of Figs. 5 and 6 and in which an oil supply tank 38 supplies oil to the engine driven pump, not shown, the pressure supply of which is led, by means of conduit 23b, to the master gauge 40 mounted on control panel 25 and thence through conduit 41 and isolating valve 42 to the duplicate indicating gauge lines 43 to the gauges 44 and 45 respectively mounted on instrument boards 24 and 22. Return line 46 and bleed control valve 47 function in the same manner for altering the cockpit oil pressure indication as the return and bleed control valve V₂ discussed in the system of Fig. 5.

Fuel pressure indication

Figure 8:
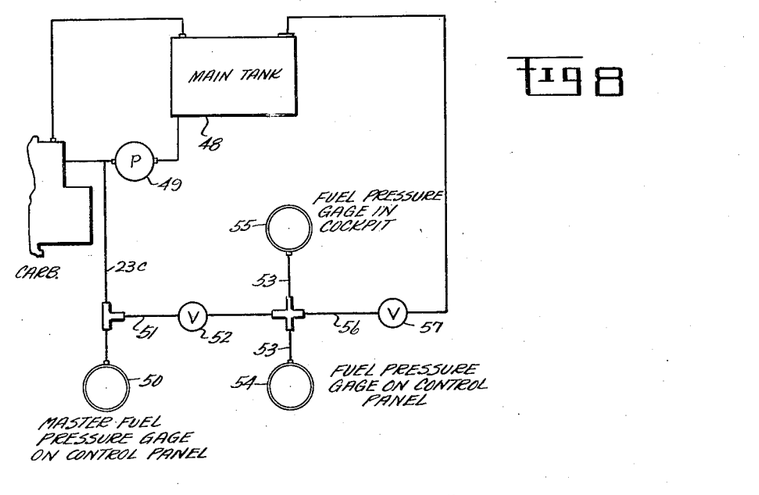
Fig. 8 illustrates the hookup of the fuel pressure indicating system.

The fuel pressure indication system as illustrated in Fig. 8 is generally similar to the system of Fig. 5 and in which a main or auxiliary tank 48 serves to supply fuel to an engine driven pump 49 which in turn supplies fuel under pressure to the engine carburetor, and a conduit 23c transmits fuel pressure directly to the master fuel pressure gauge 50 mounted on the master control panel 25 in the instructor's booth. The fuel pressure may also be transmitted by means of a conduit 51 through an isolating valve 52 to conduits 53 which respectively connect to fuel pressure gauges 54 and 55 mounted respectively on the auxiliary instrument panel 24 in the instructor's booth and on the instrument panel 22 in the airplane cockpit. Return line 56 and bleed control valve 57 function in the same manner as the return system, Fig. 5, that is, by opening valve 52 and closing valve 57, gauges 50, 54 and 55 will all read the actual fuel pressure, while by closing valve 52 and opening bleed valve 57 the fuel pressure indication on gauges 54 and 55 may be lowered to indicate incipient engine failure, requiring the student in the airplane to switch fuel tanks to restore a fuel supply to the engine.

Manifold pressure indicating system

Figures 9, 12:
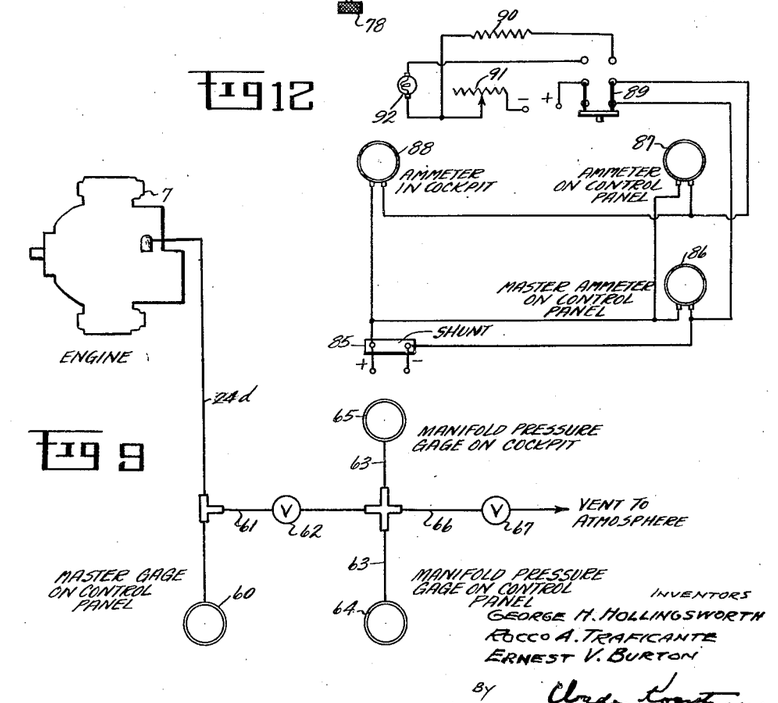
Fig. 9 illustrates the hookup of the engine intake manifold pressure indicating system.
Fig. 12 illustrates the ammeter circuit and means for controlling the ammeter indication on the instrument panel of the airplane.

The manifold pressure indicating system illustrated in Fig. 9 is also identical to the general system of Fig. 5 in which a conduit 24d transmits pressure from the intake manifold of engine 7 directly to a master gauge 60 on the control panel 25, conduit 61, isolating valve 62 when open, and conduit 63 transmits manifold pressure to manifold pressure gauges 64 and 65 mounted respectively on instrument panel 24 in the instructor's booth and on instrument panel 22 in the airplane. A return conduit 66 vented to the atmosphere by means of a bleed valve 67 may be manually actuated by the instructor. In this system opening isolating valve 62 and closing valve 67 causes the same gauge indication on all of the manifold pressure gauges while closing valve 62 and opening valve 67 vents the trapped pressure gradually to the atmosphere and causes manifold pressure indication to fall in the same manner as described with reference to Fig 5. This, of course, warns the student of incipient power plant failure or improper operation.

Altitude simulating means

Figures 10, 11:
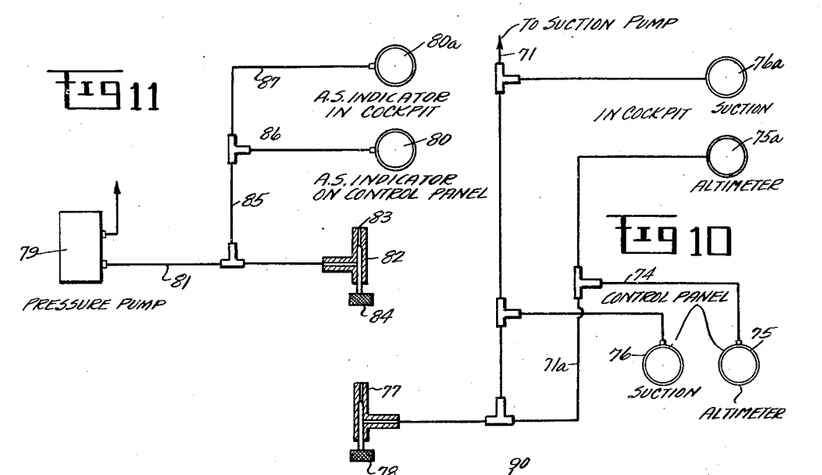
Fig. 10 illustrates means for obtaining an instrument suction and altimeter indication.
Fig. 11 illustrates the means for obtaining a simulated air-speed indication.

The means for indicating altitude of the simulated trainer flight is illustrated in Fig. 10 and comprises a conduit 71 connected to a motor-driven suction pump, not shown, positioned in the instructor's booth and having a branch 71a connected to the static pressure connections of conventional altimeters 75 and 75a positioned respectively on the instructor's instrument board 24 and on the duplicate instrument board 22 in the cockpit of the airplane so that by varying the suction in the instrument cases varying altitude may be indicated. Conventional suction gauges 76 and 76a mounted on the respective instrument boards 24 and 22 also indicate the instrument suction pressure and a needle control vent valve 77, having a manually actuated control needle assembly 78 vents the line 71 to atmosphere to regulate the altitude indication on the respective altimeters 75 and 75a to correspond to the assumed altitude obtained at various stages of the simulated flight. By means of the control valve assembly a simulated rate of ascent and descent may be obtained.

Air speed indicating system

The means for indicating the simulated air speed of the training airplane during the simulated flight as illustrated in Fig. 11 comprises a pressure pump 79 positioned in the instructor's booth 28 and driven by an electric motor, not shown. The air pressure output of the pump 79 is transmitted to a conduit 81 which may be partially or completely vented to the atmosphere by means of a regulating valve assembly 82 having a bleed port 83 in communication with the atmosphere and controlled by a needle valve assembly 84 which may be manually adjusted by the instructor so that the pressure in conduit 81 corresponds to the desired air-speed indication. The conduit 85 and branch conduits 86 and 87 transmit pressure from conduit 81 to conventional air-speed indicators 80 and 80a mounted respectively on instrument panel 24 of the instructor's booth and on the instrument panel 22 in the cockpit of the airplane. As simulated flight commences the instructor may gradually close off the bleed port 83 to cause a gradual increase in pressure in conduit 81 corresponding to the increase in air speed during the period of take-off and adjust the same during the period of climb and cruise and similarly readjust the same during the simulated landing approach so that the air speed is properly correlated to the engine R. P. M. and other factors and can at any time indicate an approaching stall.

*Ammeter indicating system*

The means for indicating the current in the aircraft electrical system is illustrated in Fig. 12 and comprises a conventional ammeter shunt 85 which shunts the indicating system around the main bus bar and having a master ammeter 86 directly connected across the shunt 85 so that at all times it indicates the actual current flow in the aircraft electrical system. Two similar ammeters, one 87 mounted on the instrument board 24 in the instructor's booth and the other 88 mounted on the instrument board 22 in the cockpit, are connected in parallel in such a fashion by means of a double-pole, double-throw switch 89 so that with the switch, as shown in the figure, ammeters 86, 87, and 88 will all read identically. In order however, to vary the indicated ammeter reading in the airplane cockpit the switch 89 may be thrown to the upper position, in which case the ammeters 87 and 88 will be connected in series from the bus bar to the ground return side of the electrical system through a fixed resistance 90 and variable resistance 91, the adjustment of the latter which will vary the ammeter reading as desired without affecting the reading on master ammeter 86. A signal light 92 indicates when the switch 89 is moved to the variable indicating position. This system, apart from being electrical, furnishes the same control over indications as is provided in the general fluid pressure system illustrated in Fig. 5 and permits the instructor to vary the ammeter indication in the airplane cockpit so as to cause a simulated indication of a pending failure of the electrical system or malfunctioning of the same.

*Fuel quantity indicating system*

Figure 13:
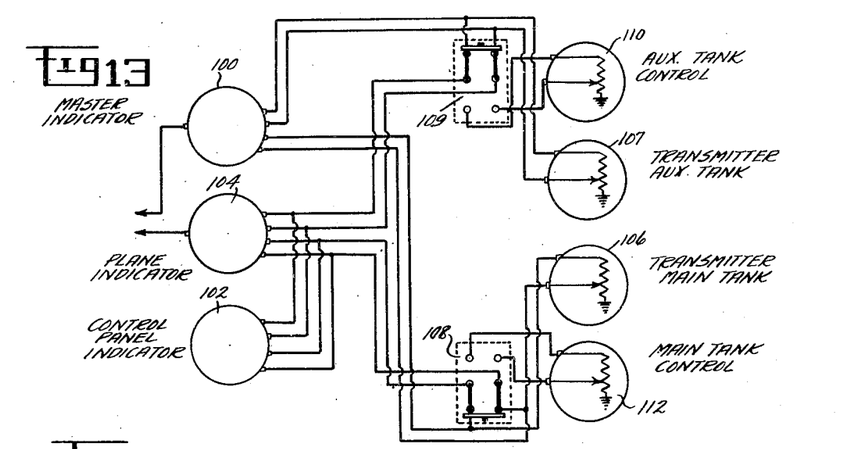
Fig. 13 illustrates the fuel quantity indicating system and means for altering the indicated quantity of fuel in the auxiliary or main tanks or both.

The system for indicating actual fuel quantity in the main and auxiliary fuel tanks of the airplane incorporates a modification of the conventional indicating system generally employed on aircraft and is illustrated in Fig. 13. As seen in this figure the reference numeral 100 indicates a master fuel quantity indicator positioned on the control panel 25 in the instructor's booth and provided with separate electrically actuated fuel quantity indicators (not shown) so as to indicate at all times the actual fuel quantity in the respective main and auxiliary fuel tanks. Parallel connected electrical indicating units 102 and 104, identical to the master indicator 100, are respectively mounted on the instrument panels 25 and 22 respectively located in the instructor's booth and airplane cockpit.

Main tank and auxiliary tank float actuated transmitters in the form of potentiometers 106 and 107 are directly electrically connected to the respective main and auxiliary tank indicating units of the master indicator 100. Double-pole, double-throw switches 108 and 109 have their switch blades respectively connected to the main and auxiliary tank indicating units (not shown) of the indicators 102 and 104. When the switches 108 and 109 are positioned as shown in Fig. 13 the main and auxiliary tank indicating units of the duplicate fuel quantity indicators 102 and 104 are electrically connected in parallel with the corresponding units of master indicator 100. In this condition indicators 100, 102 and 104 will read the true value of fuel quantity in the main and auxiliary fuel tanks as determined by the control of float actuated potentiometers 106 and 107.

If the double-pole, double-throw switch 109 is thrown to its other position the auxiliary tank indicating units of indicators 102 and 104 will be connected to a manually actuated control potentiometer 110 positioned on the master control panel 25 in the instructor's booth. By manipulation of potentiometer 110 the auxiliary fuel quantity indication on indicators 102 and 104 may be varied at will without disturbing the true indication on master indicator 100. Similarly if switch 108 is thrown to its other position the main tank indicating units of indicators 102 and 104 are electrically connected to a control potentiometer 112 which can be manipulated to cause any desired main tank fuel quantity to be indicated on the corresponding units of indicators 102 and 104 without disturbing the true indication of main tank fuel quantity on master indicator 100. The potentiometer 112 like the potentiometer 110 is positioned on the master control panel 25. The instructor at any time may thereby falsify the fuel quantity indication of either the main or auxiliary tank given to the student in the airplane cockpit without varying the true fuel quantity read on master gauge 100.

*Fuel system*

Figure 14:
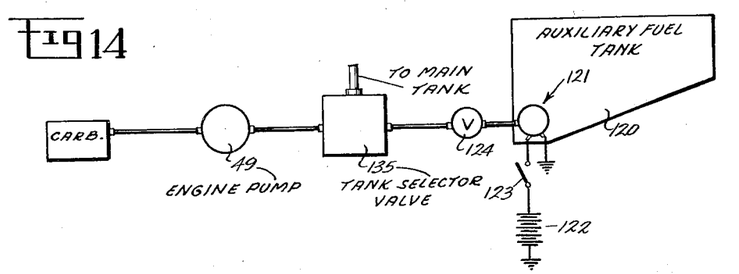
Fig. 14 is a schematic illustration of the fuel system.
Figure 15:
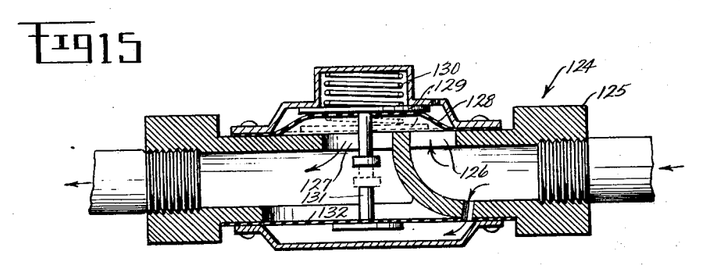
Fig. 15 is a sectional elevation of a pressure responsive cut-off valve employed in the system of Fig. 14.

The fuel system employed in the trainer is generally indicated in Fig. 14 in which reference numeral 120 indicates, for example, the auxiliary fuel tank having an electric motor driven pump generally indicated as 121 and energized from a power source such as a battery 122, which may be cut on or off by means of a control switch 123 at the instructor's option. Fuel delivered by the pump 121 passes through an automatic valve 124 to a manually actuated selector cock 135 and from thence to the engine-driven fuel pump 49. As seen in Fig. 15, the valve 124 comprises a main valve body 125 having an inlet port 126 and a discharge port 127. Flow from the inlet to the discharge port is adapted to be controlled by a flexible diaphragm 128 which when seated forms a shut-off valve to block any flow of fuel from the inlet to the discharge port. The valve diaphragm 128 is provided with a metal backing disc 129, which is acted on by a loading spring 130 that is normally set to close the valve port 127 if the inlet pressure drops below three pounds per square inch. A valve stem 131 and guide diaphragm 132 serves to complete the assembly. This device is operative such that when the pump 121 is disabled by opening switch 123 of Fig. 14 the inlet fuel pressure at port 126 is insufficient to hold the diaphragm 128 in its upper position and it is urged downwardly by spring 130 to the dotted line position as indicated cutting off any flow of fuel from port 126 to outlet port 127. This automatic valve is necessary because it otherwise might be possible for fuel to flow due to suction from the engine pump even though the auxiliary pump was disabled.

Figure 16:
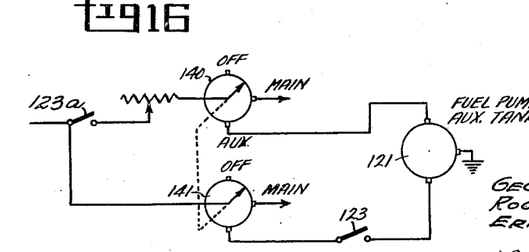
Fig. 16 is a wiring diagram illustrating the fuel tank pump circuits.

Fuel passing through the automatic valve 124 of Fig. 14 flows to the manually actuated selector valve or cock 135 which may be connected either to the main tank or auxiliary tank supply and from the selector cock fuel flows to the engine pump 49 and to the carburetor of the engine in the usual manner. The wiring arrangement for the fuel system is indicated in Fig. 16 and comprises parallel actuated switch units 140 and 141 which in turn are actuated in common with the fuel selector valve movable and to three positions; namely, "Off," "Main tank" and "Auxiliary tank" positions. When in the main position the switches 140 and 141 control the flow of current to energize the fuel tank pump on the main tank (not shown) while in the auxiliary position the auxiliary fuel tank pump 121 is energized. The switch 123 previously described permits the circuit to the auxiliary fuel tank pump to be disabled and a similar switch 123a provides for disabling the main tank booster pump (not shown).

*Propeller pitch control system*

The propeller pitch control system, as illustrated in Fig. 17, is conventional in that the propeller 6 has the pitch of its blades varied by means of an electric motor and gear reduction unit 6a and is fed with current through slip rings 6b as in the Curtiss electrical variable pitch propeller, which system is provided with the usual selector switch unit 150 mounted in the cockpit of the airplane on the instrument panel 22 and which switch can be placed in an automatic position whereby an engine driven governor, not shown, is adapted to automatically control the pitch of the propeller to maintain a preselected R. P. M. While in either the increase or decrease position the automatic control is cut out and the pitch may be increased or decreased from the existing setting to a desired value within predetermined limits. This system is provided with three indicator lights 151, 152 and 153 mounted on the master control panel 25 in the instructor's booth which indicate whether the propeller is in the automatic or increase or decrease pitch positions. This system is purely conventional and the only variation thereof to adapt the same to use in the trainer is the provision of an additional three-position switch 155 similar to switch 150 and positioned on the master control panel 25. The switch 155 permits the instructor at any time to take over control of the pitch of the propeller and adjust the same even though the student has the propeller pitch adjustment switch 150 in automatic position. By moving this switch to the increase position the automatic system is cut out and the instructor may increase the pitch to reduce engine R. P. M. and similarly by moving the switch to the decrease position he may decrease the pitch to increase the engine R. P. M. Operation of the switch 155 by the instructor is for the purpose of causing the engine R. P. M. to speed up or decrease, indicating possible failure of the automatic pitch control mechanism which requires the student to manually control the pitch of the propeller to again obtain the desired R. P. M. setting. Signal lights 151, 152 and 153 at all times give complete information to the instructor, when coupled with the R. P. M. reading, as to what the incident pitch condition of the propeller might be.

Figure 18:
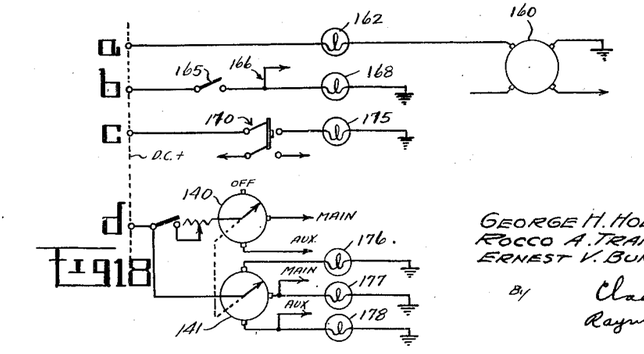
Fig. 18 is a schematic view illustrating the indicator signal lamp circuits employed in conjunction with the ignition, generator and fuel pump electrical systems.

Fig. 18 illustrates signal light or indicating systems employed to advise the instructor of the operation status of various electrical circuits such as the ignition, battery, and generator and indicating the fuel selector cock position.

In Fig. 18 at "a" the magneto switch generally indicated at 160 has a signal light 162 and circuit therefore arranged such that the light is illuminated when the magneto switch is in the "Left," "Right" or "Both" position but is extinguished when the switch is in the "Off" position.

Fig. 18 at "b" illustrates a main battery circuit in which switch 165 is the main battery switch leading to the output conductor or bus bar 156 and having a high resistance signal lamp 168 shunted between the bus 166 and the return side of the system such that the signal lamp is illuminated when the main switch 165 is closed.

In Fig. 18 at "c" one side of a double-pole, double-throw switch 170 is utilized to close an indicator circuit through signal lamp 175 while the other side of the switch is used to close the main generator circuit.

Fig. 18, at "d" indicates the circuit of Fig. 16 employed for operating the fuel pumps on the fuel tanks and actuated in conjunction with the selector cock 135 as previously explained and further showing signal lamps 176, 177 and 178 connected from the live side to the grounded or return sides of the electrical system and operative respectively to indicate the "Off," "Main tank" and "Auxiliary" tank positions of the fuel selector cock.

*General operation*

In operation, the student, after entering the cockpit of the airplane, starts the engine in the usual manner and calls to the instructor over the inter-communication system 26—27 (Fig. 2) for taxi-out instructions and take-off and the instructor calls his instructions back over the intercommunication set using tower procedure. After the pilot theoretically approaches the take-off spot he runs up his engine in accordance with briefing instructions and goes through the proper procedure of a magneto check, propeller check, controls and instrument check. Observations are made by the instructor on his technique and brief notes are kept as material for criticism after the simulated flight. A green light in the control booth is then flashed simulating a mobile control unit on the runway, and the trainee advances the throttle to take-off limits which are checked by the instructor and trainee in the control booth by observation of the engine tachometer 70 and master manifold pressure gauge 60 (Fig. 4). With the advance of the throttle noted by increasing R. P. M. the instructor gives a steady increase in indication of air speed by actuation of the control knob 84 of the air speed indicating system of Fig. 11 and at a hundred and ten miles per hour simulated air speed notes whether the trainee has retracted his landing gear, the trainee noting the indication of hydraulic gauge 35 and landing gear warning light. After the simulated take-off the instructor by actuating the control knob 78 of Fig. 10 causes the simulated altimeter reading to be increased at a rate of approximately 500 feet per minute and it is noted whether or not the student decreased the throttle setting for climb.

After additional altitude has been gained, the instructor increases the air-speed indication to two hundred miles an hour and manifold pressure should have been reduced by the trainee to twenty-five inches for cruising. The trainee pilot has been briefed to switch his tank to "auxiliary" and is then called on for continual check as to instrument readings and their signification. Also, his auxiliary fuel supply may be cut at any time, with the first indication being a drop in fuel pressure, instituted by the instructor by closing valve 52 of the fuel pressure indication system, Fig. 8, and gradually opening bleed valve 57 which will cause a drop in the indicated fuel pressure on the gauge 55 in the airplane cockpit. This may be followed by a cutting out of the motor driving current supply for the auxiliary fuel pump 121 of the auxiliary fuel tank 120 by opening switch 123, Figs. 14 and 16, causing valve 124 of Fig. 15 to close which will gradually cause an actual drop in fuel pressure and coughing and stoppage of the engine if the fuel selector cock 135, Fig. 14 is not switched to the other source of supply. Besides controlling fuel pressure indications and the fuel supply, variations can be made in the setting of the ammeter by means of the electrical indicating system of Fig. 12 and in this connection the propeller may be made to run to high or low R. P. M. at the will of the instructor causing the pilot to use proper corrective action by placing it under manual control and increasing or decreasing the propeller pitch to regain the desired engine R. P. M., this procedure being accomplished as described with respect to the propeller pitch control system of Fig. 17. The manifold pressure can also be fluctuated by means of the manifold pressure indicating system of Fig. 9 with the result that the trainee should call the instructor over the interphone communication system for an emergency landing after reduction of power. The hydraulic gauge 35 indicating the pressure in the hydraulic system can always be controlled by means of the indicating system of Fig. 6 so as to result in a zero pressure indication in the cockpit after the pilot simulates break-away and lowers his wheels for landing. In this way it can be determined whether the trainee pilot actually checks his hydraulic gauge as an additional indication of the wheels being down. The oil pressure indication in the airplane cockpit can be reduced at any time during flight, by means of oil pressure indicating system of Fig. 7, causing the trainee pilot to call the instructor, similar to calling the tower, for an emergency landing and to reduce his power settings.

The pilot, prior to his simulated flight, the inter-phone communication system 26—27, Fig. 2, being employed in a manner similar to conventional normal radio procedure and the pilot calls on his break-away, reduces his throttle setting and lowers his landing gear in an approach for a simulated landing with the instructor correspondingly decreasing the air speed indication to a hundred and fifty miles per hour.

The trainee calls on his base leg and the instructor by increasing or decreasing his air speed by means of the air-speed indicating system of Fig. 11 requires the pilot to make appropriate use of the throttle which can be checked by observation of the tachometer 70 on the master control panel and on the duplicate instrument board in the instructor's booth. On his approach, the trainee must lower the flaps when an air speed of a hundred and thirty miles per hour is given him, with the instructor slowly reducing it to one hundred miles per hour by means of the air speed indicating system, Fig. 11, at which time the simulated landing is assumed to have been completed and the flaps are raised and engine shut off. By means of the trainer system provided by the present invention it is possible to continue a number of simulated flights in exactly the same manner as indicated above without causing any emergency indication to arise and that at any time during the simulated flight an emergency such as power plant failure or hydraulic system failure or the like as outlined above may be indicated to see whether or not the student immediately responds to the indications of an emergency situation and takes the proper corrective measures.

Observation made of trainees who have undergone transition training on a trainer in accordance with this invention has shown that if the troubles noted were experienced by them while in the air on an actual flight, one out of seven, who demonstrated confusion in the training device, probably would have experienced the same difficulty resulting in a fatal accident to himself or his airplane in actual flight. While all of the troubles artificially placed and confronting the trainees during instruction on a trainer in accordance with the present invention are not every day occurrences, their existence is recognized and this training device, therefore, can prevent a repetition of such an occurrence when the pilot has been checked out in actual flight.

Continued use of trainers built in accordance with the principles of the present invention as illustrated has conclusively shown that, after four hours instruction and briefing on proper cockpit procedure and simulated flight in the trainer, accidents due to faulty procedure in actual flight can be largely prevented.

While this invention has been illustrated and described, particularly with respect to a high performance fighter airplane principles of the invention are equally well adapted to use in giving transitional instruction on multi-engine aircraft, since the principles of the invention can be applied to plural power plants as readily as to a single engine aircraft merely by extension of the indication system herein generally disclosed and the invention is also applicable to give training on large multi-engine aircraft, such as B-29 bombers to members of the crew other than the pilot by introducing emergency malfunctioning of various components of the aircraft requiring the crew members to take emergency measures of a standard procedural form.

Having described one form of the invention, other alternatives, variations and changes therein will become apparent to those skilled in the art as falling within the scope of the invention as defined in the appended claims.

We claim:

1. A transition training device for instructing a student pilot in the proper manipulation of an aircraft power propulsion unit, retractible landing gear, wing flaps and the like under simulated take off, flight and landing comprising, a captive airplane provided with an operative engine, an automatic variable pitch propeller driven thereby, power actuated retractible landing gear and wing flaps and a plurality of master transmitting means each for transmitting to a remote indicator a variable quantity such as a fluid pressure, electric current and the like representative of the instant value of an operating condition of an aircraft element such as the power plant, landing gear, wing flaps and the like, said airplane being supported in a cradle structure so as to be immobile and providing ground clearance for operation of the propeller and landing gear, an instructor's station positioned away from and in full view of the airplane and including a master control panel having master indicating instruments thereon each operatively connected to a respective one of said master transmitting means, duplicate instrument boards having indicating instruments thereon corresponding to the master indicating instruments, one of said instrument boards being positioned in the airplane cockpit and the other board being positioned adjacent the master control panel, operative connections between the instruments on the duplicate instrument boards and the master transmitting means, and means adapted to be controlled at will by the instructor for isolating the one or more of the instruments on the said duplicate instrument boards from operative connection with the master transmitting means to vary the indication from the value indicated on the corresponding master indicating instrument.

2. The device as claimed in claim 1, in which certain of said master transmitting means include fluid pressure conduits operatively connected to pressure sources such as the engine oil lubricating system, carburetor fuel supply, engine manifold, hydraulic power system and the like, said conduits being directly connected to respective master indicating instruments, a return conduit connected to each fluid pressure conduit, the corresponding duplicate instruments on said instrument boards being connected in parallel to the respective return conduits, valve means in each return conduit to prevent flow therethrough to said duplicate instruments and valve means in each return conduit beyond the connection of the duplicate instruments thereto for relieving trapped fluid under pressure in the return conduit to cause a change in indication on the duplicate instruments to simulate the indication of a dangerous operating condition of a component of the aircraft.

3. The structure as claimed in claim 1, in which certain of said master transmitting sources comprise electrical conductors carrying currents proportional to factors such as total current in the airplane electrical supply system, currents which are a measure of the quantity of fuel in the fuel supply system and the like, said master and duplicate instruments connected to said master transmitting conductors to give identical indications, and switch means for disconnecting the duplicate instruments from said electrical conductors and for connecting the same to adjustable sources of current of a different value than the master sources whereby the indication on the duplicate instruments may be varied from the value indicated on the corresponding master indicator.

4. A transition training device for instructing a student in the proper manipulation of engine, variable pitch propeller, retractible landing gear wing flaps, fuel system and the like under conditions simulating take-off, flight and landing comprising an operative airplane of the type to which transition is to be made, said airplane being cradled so as to permit operation of the power plant, propeller retractible landing gear and wing flaps thereof, a master control panel positioned remote from the airplane to be observed by an instructor and having master instruments thereon operatively connected for indicating the value of operating factors such as engine speed, oil pressure, manifold pressure, fuel pressure, hydraulic system pressure and the like, an instrument panel in the airplane and having instruments thereon duplicating the master instruments, means interconnecting the duplicate instruments to the master instruments such that the instruments normally indicate the same values of the respective operation factors and means on the master control panel for isolating one or more of the airplane instruments from the corresponding master instrument and for varying the indication thereon to simulate departure of the corresponding operating factor from a safe operating value.

5. The structure as claimed in claim 4, in which certain of said master instruments are connected by main fluid pressure transmitting conduits to the source of pressure to be indicated, branch conduits connected to each respective main conduit, pressure transmitting connections between each duplicate instrument on the airplane instrument board and a respective branch conduit, a manually actuated valve in each branch conduit for interrupting transmission of fluid pressure to the duplicate instrument and additional valve means for venting trapped fluid under pressure from any selected branch conduit so as to cause a false indication on the corresponding duplicate instrument without disturbing the indication on the corresponding master instrument.

6. In a training device of the character described, a master indicating instrument operatively connected by a main conduit to a source of fluid pressure, which pressure is a direct measure of the actual value of an operation factor of an aircraft such as manifold, oil, fuel and hydraulic system pressures and the like, a duplicate instrument connected by a branch conduit to the main conduit such that the master and duplicate instruments normally give the same indication and manually actuated valve means for isolating the duplicate instrument from pressure transmitting relation with the main conduit and for relieving trapped fluid pressure in the branch conduit so as to give an altered indication on the duplicate instrument.

7. In a training device of the character described, a master indicating instrument, operatively electrically connected to a source of current which varies in accordance with the actual value of an operation factor of an aircraft such as fuel quantity, electrical system current and the like, a duplicate indicating instrument, separate electrical connections between the master and duplicate instruments whereby parallel indications are normally given on the corresponding master and duplicate instruments, means for electrically isolating the duplicate instrument from operative connection with the master instrument and means for supplying the duplicate instrument with electric current so as to alter the indication thereof from the value indicated on the master instrument.

GEORGE H. HOLLINGSWORTH.
ERNEST V. BURTON.
ROCCO A. TRAFICANTE.

REFERENCES CITED

The following references are of record in the file of this patent:

UNITED STATES PATENTS

| Number | Name | Date |
|---|---|---|
| 1,759,318 | Mercier | May 20, 1930 |
| 2,164,412 | Koster | July 4, 1939 |
| 2,366,603 | Dehmel | Jan. 2, 1945 |

FOREIGN PATENTS

| Number | Country | Date |
|---|---|---|
| 396,537 | Great Britain | Aug. 10, 1933 |